United States Patent [19]
Gotoh

[11] Patent Number: 5,062,013
[45] Date of Patent: Oct. 29, 1991

[54] TAPE RECORDER INCLUDING CAM OPERATED MODE CHANGING MECHANISM

[75] Inventor: Toshihisa Gotoh, Tokyo, Japan

[73] Assignee: Nippon Standard Telecommunications Co., Ltd., Tokyo, Japan

[21] Appl. No.: 448,933

[22] Filed: Dec. 12, 1989

[30] Foreign Application Priority Data

Jul. 14, 1989 [JP] Japan ................................. 1-181770

[51] Int. Cl.⁵ ....................... G11B 15/00; G11B 5/008
[52] U.S. Cl. ..................................... 360/90; 360/96.3; 360/137
[58] Field of Search ............... 360/137, 90, 96.3, 96.5

[56] References Cited

U.S. PATENT DOCUMENTS

| | | | |
|---|---|---|---|
| 4,638,386 | 1/1987 | Takamatsu | 360/90 |
| 4,788,607 | 11/1988 | Ogawa | 360/96.3 |
| 4,831,660 | 5/1989 | Koga et al. | 360/90 |
| 4,853,804 | 8/1989 | Suwa et al. | 360/96.5 |
| 4,922,357 | 5/1990 | Komatsu et al. | 360/96.3 |

Primary Examiner—Aristotelis Psitos
Assistant Examiner—Jefferson Evans
Attorney, Agent, or Firm—Spensley Horn Jubas & Lubitz

[57] ABSTRACT

Here is disclosed a tape recorder including a mode changing mechanism which comprises, in turn, a cam gear operatively associated with a head base so that the cam gear is rotated in accordance with forward or reverse rotation of an electromotor to achieve a desired mode change among "stop", "recording/reproduction", "fast forwarding" and "rewinding" modes.

25 Claims, 7 Drawing Sheets

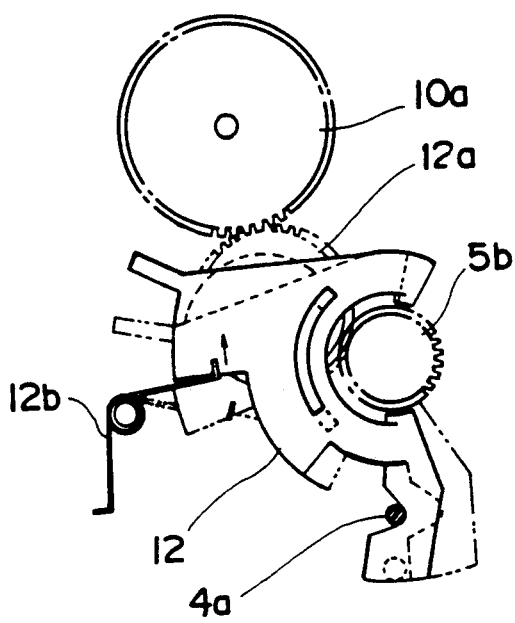
F I G. 8
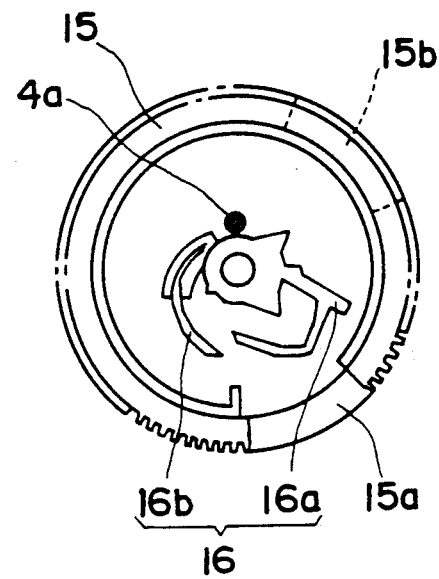
F I G. 9(a)
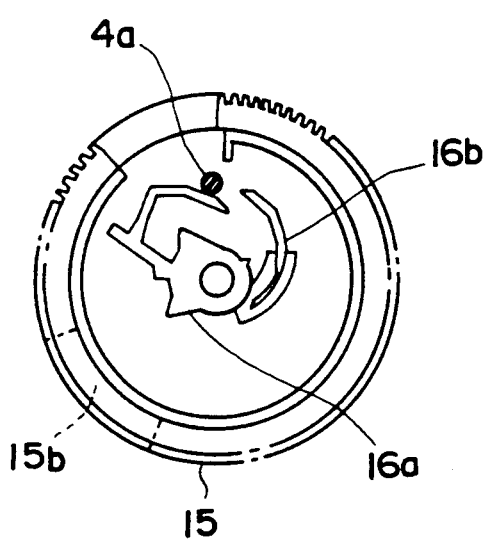
F I G. 9(b)
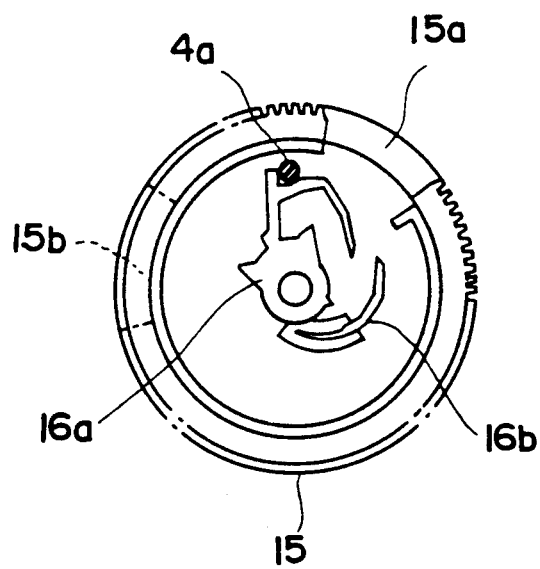
F I G. 9(c)

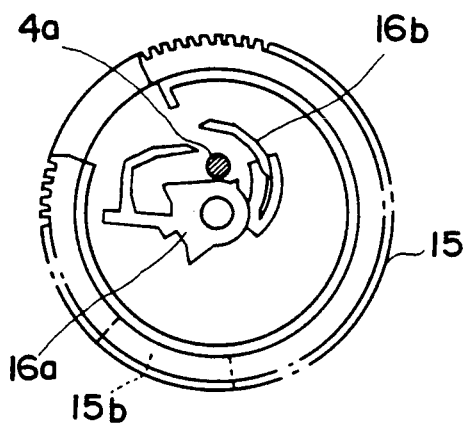
F I G. 9(d)
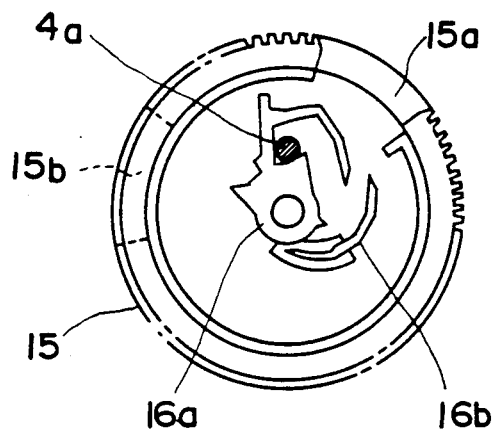
F I G. 9(e)
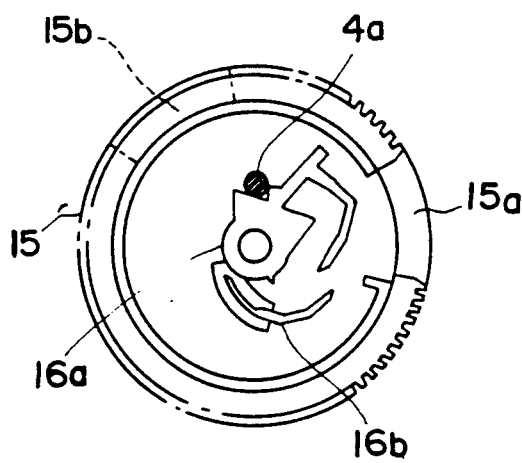
F I G. 9(f)
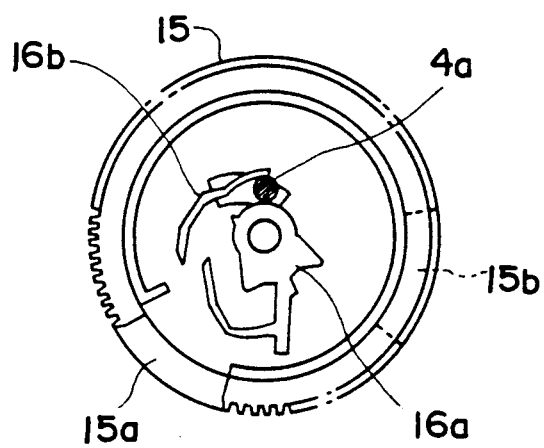
F I G. 9(g)

TAPE RECORDER INCLUDING CAM OPERATED MODE CHANGING MECHANISM

BACKGROUND OF THE INVENTION

1. Field of the Invention

The present invention relates to a tape recorder.

2. Background Art

The conventional tape recorder has utilized a single or plurality of solenoids in order to control the tape recorder in mode change as among "recording/reproduction", "fast forwarding" and "rewinding" modes.

For example, in the case of the tape recorder disclosed in the specification of U.S. Pat. No. 4,720,755, there is provided an assist gear selectively establishing desired modes through its camming function. The rotation and stopping of this assist gear is controlled by selective engagement of a trigger arm, adapted to be activated by a solenoid, with respective control portions of said assist gear.

However, use of a single or plurality of solenoids to control the mode changes results in an increased size and an increased manufacturing cost of the tape recorder.

SUMMARY OF THE INVENTION

It is therefore an object of the invention to provide a tape recorder adapted to be controlled for mode changing by rotation of an electromotor rather than by use of the solenoid, so as to reduce the weight, dimension, number of parts and manufacturing cost of the tape recorder.

This object is achieved, in accordance with an embodiment of the invention by a tape recorder having a mode changing mechanism comprising a circular cam gear including a front side toothless segment recessed from the front side of the gear in a direction of the tooth thickness, a rear side toothless segment recessed from the rear side of the gear in a direction of the tooth thickness and displaced from said front side toothless segment by a predetermined angular distance, and a cam portion operatively associated with a head base so as to control movement of the head base as said cam gear is rotated forwardly or reversely; a pair of forward-/reverse (FR) gears mounted on opposite sides of a pivotal FR arm, said pair of FR gears being displaced from each other in the direction of the tooth thickness and engageable with said cam gear; and a power transmission mechanism adapted to transmit a drive from an electromotor to said pair of FR gears and to rotate said FR arm so as to rotate one of said FR gears depending on a rotational direction of the electromoter into engagement with said cam gear.

It is also possible within the scope of the invention that the power transmission mechanism for the above-mentioned purpose comprises a flywheel adapted to be rotatably driven by an electromotor in the same direction as that in which the electromotor rotates and a pair of FR gears mounted on opposite sides of a FR arm pivotally mounted on a rotation shaft of said flywheel so as to be engaged with a cam gear which is integral and coaxial with said flywheel so that one of said FR gears may be selectively engaged with said cam gear as said flywheel and therefore said FR arm are rotated.

BRIEF DESCRIPTION OF THE DRAWINGS

FIGS. 6 (a) and (b) is a gear system diagram showing operative relationship between the toothless segments of the cam gear and the FR gears;

FIG. 8 is a partial diagram showing a movement of a FWD plate;

FIGS. 9 (a) through (g) is a front view of the cam gear showing a relationship between a cam portion thereof and the head base shaft;

DESCRIPTION OF THE PREFERRED EMBODIMENT

The invention will be better understood from the description given below, referring to preferred embodiments illustrated in the accompanying drawings.

Figure 1:
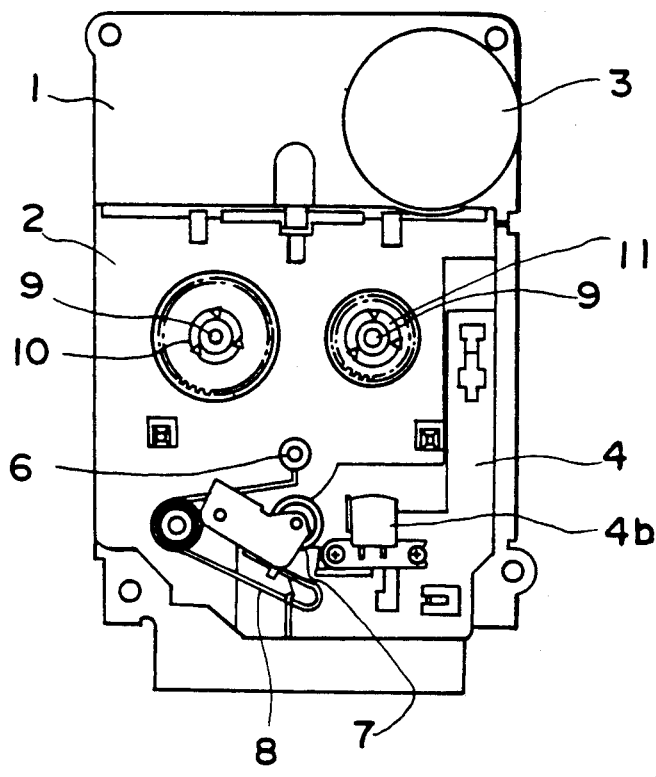
FIG. 1 is a front view of a tape recorder according to an embodiment of the invention.

FIG. 1 is a front view of a tape recorder according to an embodiment of the invention.

A chassis 1 carries an electromotor 3 at a right upper area and a mechanic base 2 at central area.

The mechanic base 2 is provided at an upper portion thereof with a pair of reel shafts 9, of which the left one supports a tape take-up reel 10 and the right one supports a tape supply reel 11.

The mechanic base 2 is also provided at the upper portion with a head base 4 which is movable vertically as viewed in FIG. 1. The head base 4 is centrally provided with a head 4b fixedly mounted thereon. On the left hand of the head base 4, there is provided a head base shaft 4a extending rearwardly (See FIG. 3).

The mechanic base 2 is centrally provided with a capstan 6 which is integral with a flywheel 5 and projects from the rear side of the mechanic base 2. The mechanic base 2 includes also a pinch roller 7 rotatably supported thereon. On the left side, there is provided a head base spring 8.

The head base spring 8 is anchored at one end on the head base 4 and the pinch roller 7 so as to bias the head base 4 downwardly as viewed in FIG. 1. As the head base 4 is moved upwardly in the "recording/reproduction" mode, the pinch roller 7 is operatively associates with the head base 4 and thereby engaged with the capstan 6.

Figure 2:
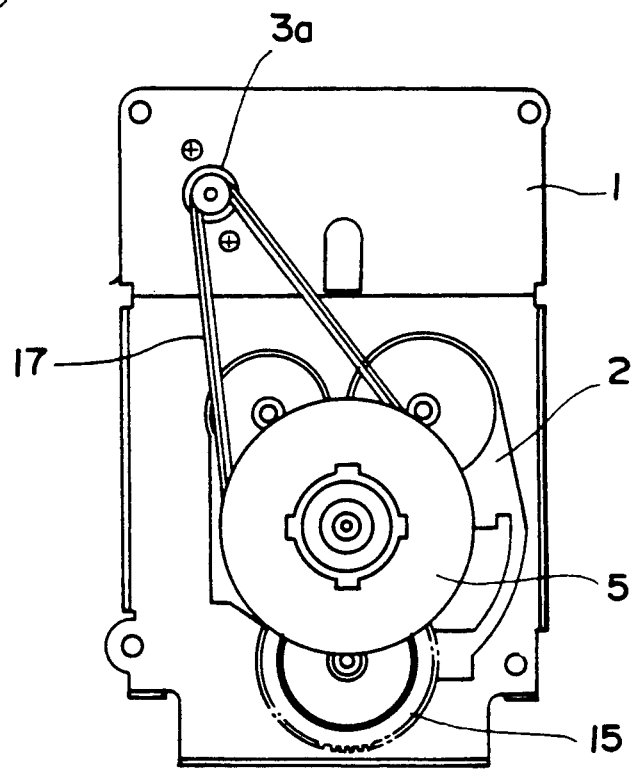
FIG. 2 is a rear view of said tape recorder.

FIG. 2 is a rear view of the tape recorder embodying the invention.

A pulley 3a is mounted on the electromotor 3 and transmits rotation of the electromotor 3 to the flywheel 5 via a flywheel belt 17. It should be understood that the electromotor 3 and the flywheel 5 are rotated in a same direction.

Figure 3:
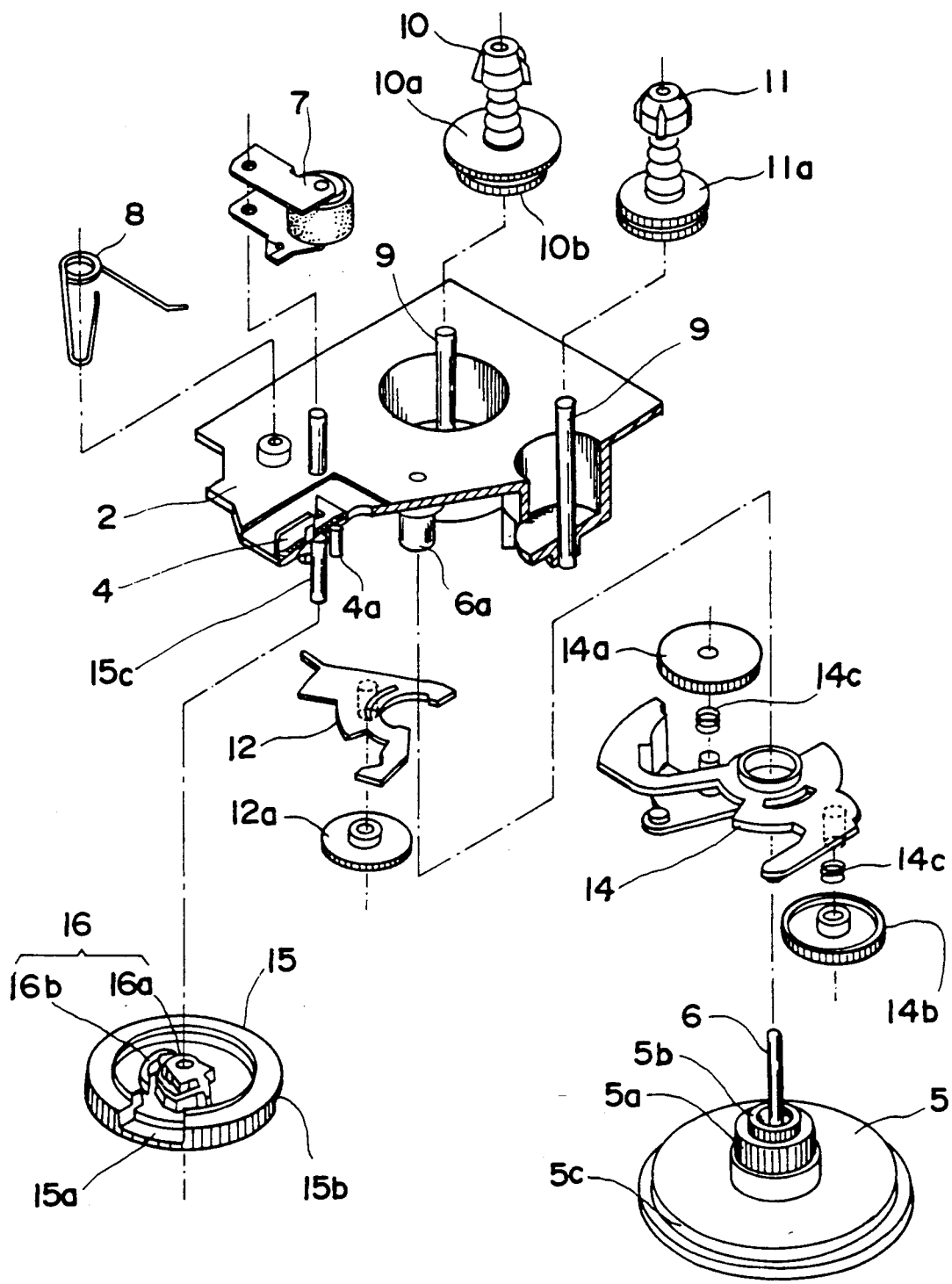
FIG. 3 is an exploded perspective view of said tape recorder.

FIG. 3 is an exploded perspective view of the mechanic base 2. The tape take-up reel 10 carries thereon a large-diametered gear 10a and a small-diametered gear 10b while the tape supply reel 11 carries thereon a gear 11a.

The large-diametered gear 10a carried on the tape take-up reel 10 is located to be engageable with a foward (FWD) gear 12a and the small-diametered gear 10b is located to be engageable with a FR gear 14a. The gear 11a carried on the tape supply reel is located to be engageable with a forward/reverse (FR) gear 14b.

The mechanic base 2 is centrally provided with a capstan support shaft 6a projecting from the rear side thereof and carries thereon a FWD plate 12, a FR arm 14 and a flywheel 5 in this order.

The FWD plate 12 is configured as shown in FIGS. 3 and 8. A FWD gear 12a is rotatably mounted on the FWD plate 12.

As seen in FIG. 8, there is provided on the left side of the FWD plate 12 a FWD spring 12b adapted to bias the FWD plate 12 in a direction indicated by an arrow. However, movement of the FWD plate 12 is restricted by the head base shaft 4a except in the "recording/reproduction" mode.

Figure 4:
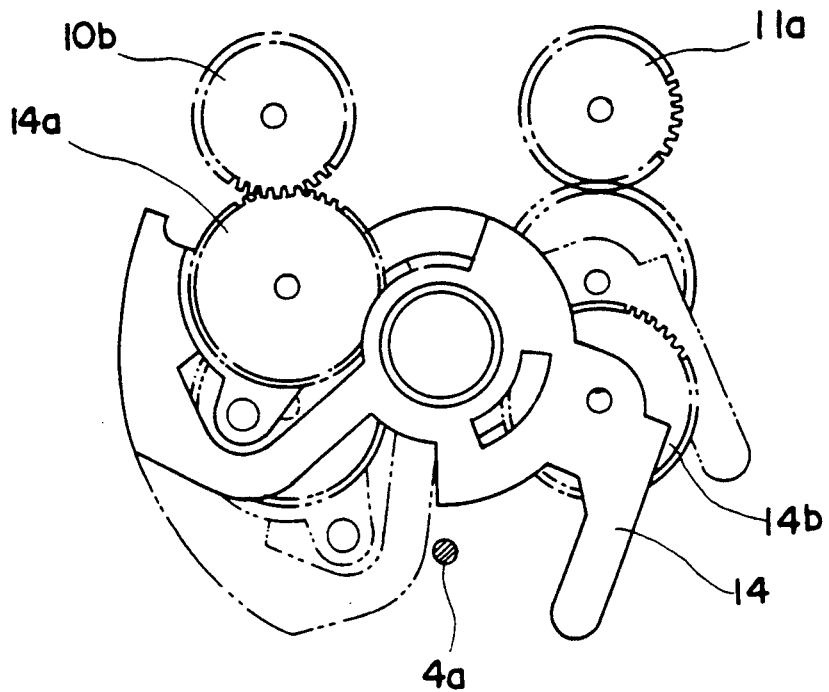
FIG. 4 is a partial diagram showing a range in which the FR arm can be rotated.

The FR arm has a configuration as shown by FIG. 3 and carries a FR gear 14a on the left side and a FR gear 14b on the right side, both the FR gears 14a, 14b are provided with respective FR springs 14c. The FR arm 14 is rotatable in a direction depending on the direction in which the flywheel 5 rotates under loading of said FR springs 14c, as shown in FIG. 4. As will be apparent from FIG. 7, the FR gear 14a and the FR gear 14b are axially displaced. This arrangement is related to functions and arrangement of a cam gear 15, particularly toothless segments thereof as will be described later.

Figures 6A, 6B, 7:
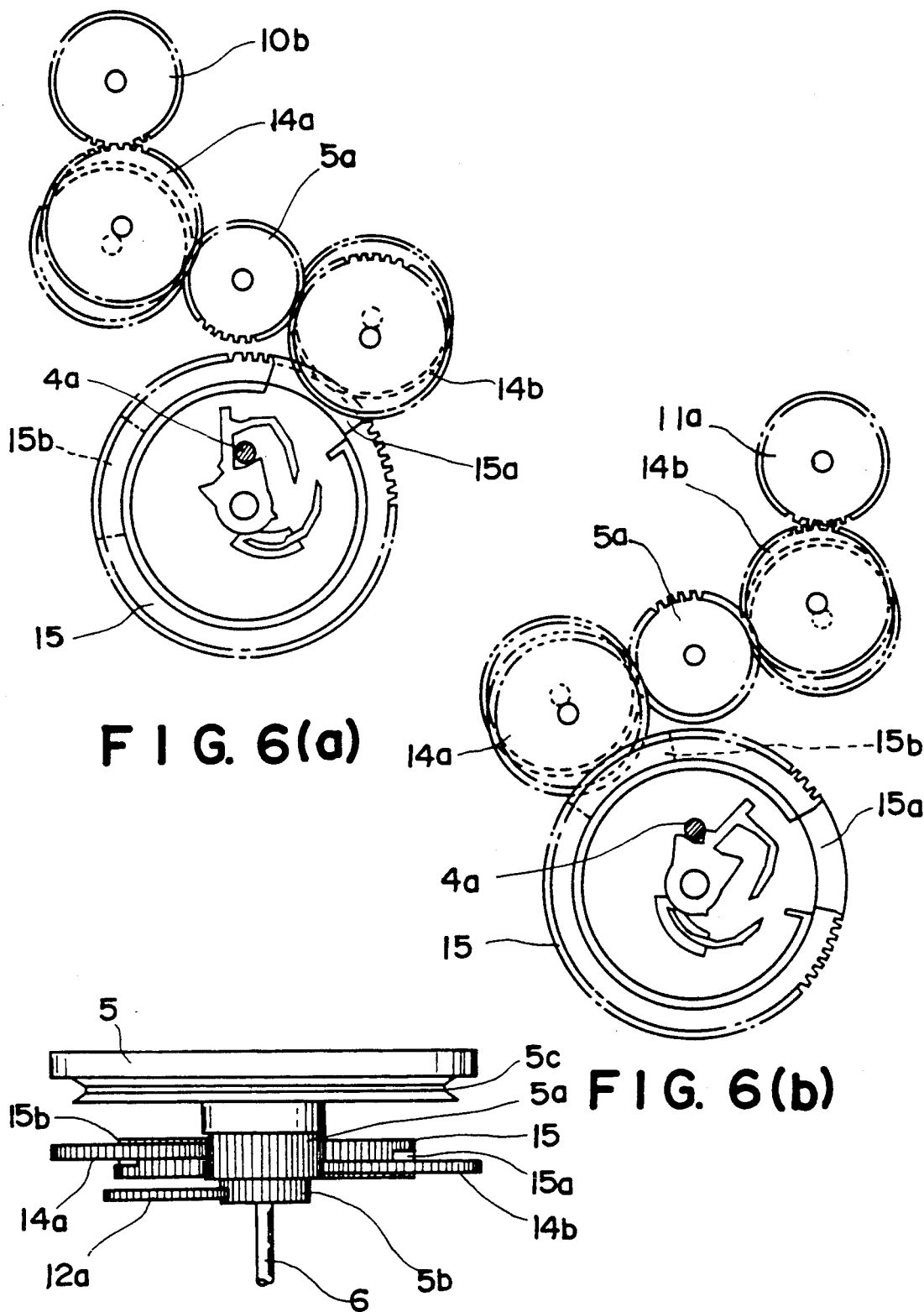
FIG. 7 is a partial diagram showing mutual engagement of the respective gears.

Referring to FIGS. 2, 3 and 7, the flywheel 5 is peripherally provided with a groove 5c for cooperation with a flywheel belt 17 adapted to transmit rotation of the electromotor 3 to the flywheel 5. The capstan 6 is fixed to the flywheel 5 and projects on the front side through the capstan support shaft 6a. The flywheel 5 is integrally formed with a larger-diametered gear 5a and a small-diametered gear 5b. Normally, the large-diametered gear 5a is engaged with the FR gears 14a, 14b and the small-diametered gear 5b is engaged with the FWD gear 12a.

Referring to FIG. 3, the head base shaft 4a extends from the mechanic base 2 at the left zone thereof and, on the left side of this head base shaft 4a, a cam gear shaft 15c is fixed to the mechanic base 2 so as to mount the cam gear 15 thereon. The head base shaft 4a is in contact with a cam portion 16 of the cam gear 15 so that the head base shaft 4a moves along a contour of the cam portion 16 and determines a movement of the head base 4.

The cam gear 15 has a configuration as shown by FIGS. 3 and 9. The cam gear 15 includes a front side toothless segment 15a and a rear side toothless segment 15b spaced from each other by a predetermined angular distance. The cam gear 15 is centrally provided with said cam portion 16.

The cam portion 16 consists of a central wall part 16a and an outer wall part 16b which is movable at one end. This cam portion 16 controls the movement of the head base 4.

Rotation of the electromotor 3 is transmitted by the FR gear 14a or the FR gear 14b the the cam gear 15.

Now operation of the above-mentioned embodiment will be described.

Initial Position

The head base 4 is maintained at a lower position, as seen in FIG. 1, under a biasing effect of the head base spring 8. At this time point, the head base shaft 4a is in contact whith the central wall part 16a of the cam portion 16, as seen in FIG. 9 (a).

Transient Point of "Recording/Reproduction" and "Fast Forwarding" Modes

When the electromotor 3 is rotated clockwise as viewed in FIG. 1, the flywheel 5 is also rotated clockwise by the flywheel belt 17.

In accordance with such rotation of the flywheel 5, the FR arm 14 is also clockwise rotated and the FR gear 14b is engaged with the cam gear 15, resulting in clockwise rotation of the cam gear 15.

Although the FR gear 14a is rotating, no rotational drive is transmitted to the tape take-up reel 10 because said FR gear 14a is not in engagement with the small-diametered gear 10b.

The FWD gear 12a is also rotating, but this FWD gear 12a is not in engagement with the large-diametered gear 10a of the tape take-up reel 10.

The head base shaft 4a moves from the central wall part 16a to the outer wall part 16b of the cam portion 16, as the cam gear 15 is rotated clockwise. As the cam gear 15 is further rotated clockwise, the head base shaft 4a moves to a tip of the central wall part 16a as shown by FIG. 9 (b). This position of the head base shaft 4a corresponds to the transient point between "recording/reproduction" and "fast forwarding" modes.

"Recording/Reproduction"

As the electromotor 3 is further rotated clockwise beyond said transient point between "recording/reproduction" and "fast forwarding" modes, the head base shaft 4a moves along the tip of the central wall part 16a. When the head base shaft 4a has reached a root of said tip as shown by FIG. 9 (c), the head base 4 occupies a position of "recording/reproduction" and the pinch roller 7 is engaged with the capstan 6.

Upon upward movement of the head base shaft 4a as shown by FIG. 8, the head base shaft 4a enters into a recess of the FWD plate 12 and the latter is rotated in a direction indicated by an arrow under a biasing effect of the FWD spring 12b. The FWD gear 12a is engaged with the large-diametered gear 10a of the tape take-up reel 10 so as to transmit rotation of the electromotor 3 to the tape take-up reel 10 for tape taking-up.

Figure 5:
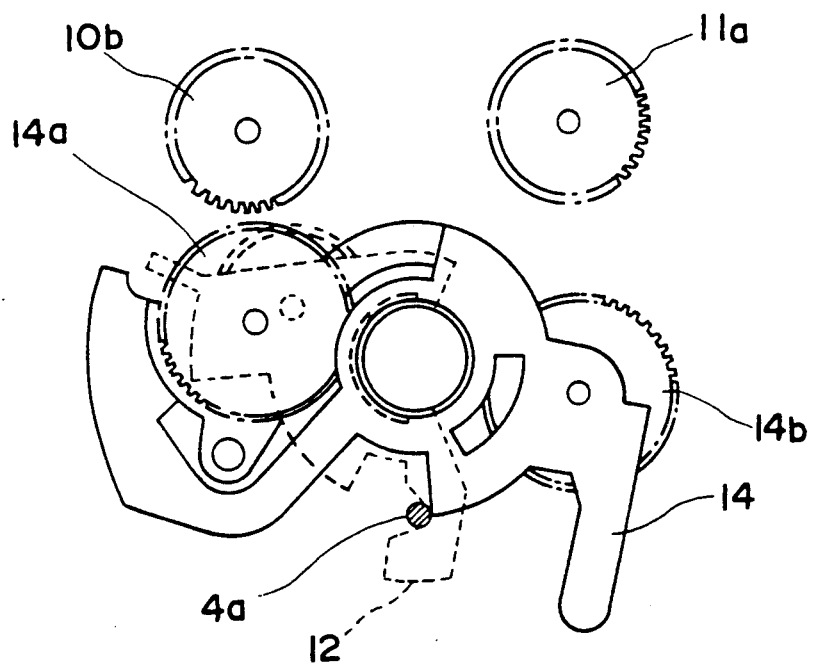
FIG. 5 is a partial diagram showing how a head base shaft restricts the pivotal movement of the FR arm.

When the head base shaft 4a has moved to the root of the tip of the central wall part 16a, the front side toothless segment 15a of the cam gear 15 is opposed to the FR gear 14b so that no rotation of the FR gear 14b is transmitted to the cam gear 15 and, in consequence, the cam gear 15 ceases to be rotated. At this time point, the FR gear 14b is positioned inside the front side toothless segment 15a of the cam gear 15, attempting to engage the FR gear 14a with the small-diametered gear 10b of the tape take-up reel 10. However, as will be apparent from FIG. 5, the FR arm 14 is partially restricted by the head base shaft 4a and the FR gear 14a cannot be engaged with the small-diametered gear 10b.

"Fast Forwarding"

When the electromotor 3 is rotated counterclockwise at the transient point between "recording/reproduction" and "fast forwarding" modes, the head base shaft 4a moves to the inner side of the cam portion 16 as seen in FIG. 9 (d). Upon rotating the electromotor 3 clockwise again, the head base shaft 4a moves along the central wall part 16a. When the head base shaft 4a has reached an inner recess of the central wall part 16a as shown by FIG. 9 (e), the head base 4 occupies a position of "fast forwarding" mode.

When the head base shaft 4a has reached said inner recess of the central wall part 16a, the front side toothless segment 15a of the cam gear 15 is opposed to the FR gear 14b and rotating of the FR gear 14b is no longer transmitted to the cam gear 15 with a result that the cam gear 15 ceases to be rotated. At this time point, the FR gear 14b overlaps the front side toothless segment 15a of the cam gear 15 as shown by FIG. 6 (a) and the FR gear 14a is engaged with the small-diametered gear 10b of the tape take-up reel 10 so as to transmit rotation of the electromotor 3 to the tape take-up reel 10, establishing the "fast forwading" mode.

"Rewinding"

For changing from "initial position" to "rewinding" mode, the electromotor 3 is counterclockwise rotated. As a result, the flywheel 5 is also counterclockwise rotated, thereby the FR arm 14 is rotated in the same direction and the FR gear 14a is engaged with the cam gear 15 to rotate the latter counterclockwise.

When the head base shaft 4a has reached an outer recess of the central wall part 16a as shown by FIG. 9 (f), the rear side toothless segment 15b of the cam gear 15 is opposed to the FR gear 14a so that no rotation of the FR gear 14a is transmitted to the cam gear 15, resulting in that the cam gear 15 ceases to be rotated. The FR gear 14a enters into the inside of the rear side toothless segment 15b as shown by FIG. 6 (b) and the FR gear 14b is engaged with the gear 11a of the tape supply reel 11, establishing the "rewinding" mode.

Changing from "recording/reproduction" and "fast forwarding" modes to "rewinding" mode is also achieved by rotating the electromotor 3 counterclockwise.

For changing from "fast forwarding" mode to "rewinding" mode, the head base shaft 4a moves along the inside of the central wall part 16a of the cam portion 16 back to the "initial position" as shown by FIG. 9 (a). At this time point, one end of the outer wall part 16b is movable, so the head base shaft 4a can easily pass between the central wall part 16a and the outer wall part 16b as shown by FIG. 9 (g).

For changing from "recording/reproduction" mode to "rewinding" mode, the head base shaft 4a moves along the tip of the central wall part 16a, entering into the inside of the central wall part 16a of the cam portion 16 as shown by FIG. 9 (d), back to the "initial position".

The process thereafter is identical to the case of the change over from the "initial position" to the "rewinding" mode.

"Stop"

Changing from "recording/reproduction" and "fast forwarding" to "stop" occurs in a similar manner to restoration of the "initial position" as has been mentioned above in the paragraph "rewinding". Rotation of the electromotor 3 is stopped when the head base shaft 4a has moved back to the "initial position" as shown by FIG. 9 (a).

For changing from "rewinding" to "stop", the electromotor 3 is clockwise rotated and, when the head base shaft 4a has moved back to the "initial position" as shown by FIG. 9 (a), rotation of the electromotor 3 is stopped.

As another embodiment, the cam portion of the cam gear 15 may comprise grooves to achieve a comparative effect.

Referring to FIG. 10, a cam portion 20 comprises an outer circumferential groove 20a and an inner circumferential groove 20b. The cam portion 20 is centrally provided with a movable wall 20c which is movable vertically as viewed in FIG. 1.

Relationship between the cam portion 20 and the head base shaft 4a is identical to the relationship established between the previously mentioned cam portion 16 comprising the central wall part 16a and the outer wall part 16b and the head base shaft 4a.

Figure 10A:
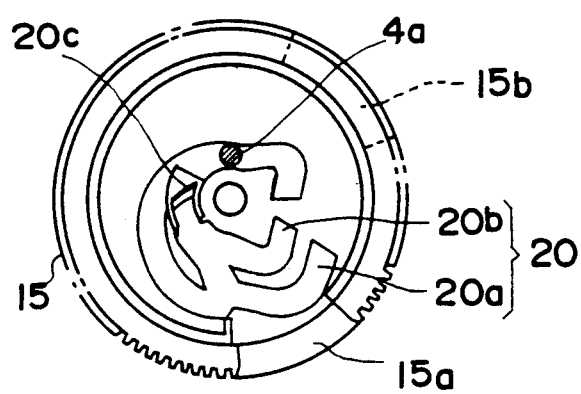
FIGS. 10 (a) through (d) is a front view of another embodiment of the cam gear showing a relationship between a cam portion thereof and the head base shaft.
Figure 10B:
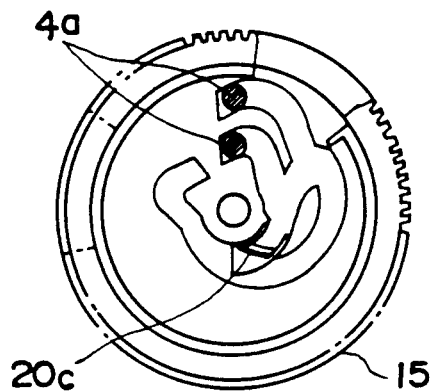
Figure 10C:
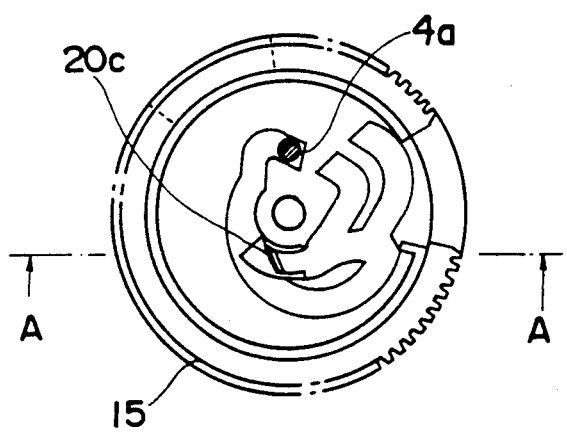
Figure 10D:
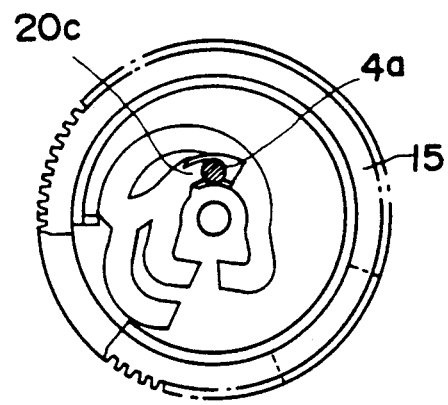

Clockwise rotation of the cam gear from the "initial position" as shown in FIG. 10(a) causes the mode changes to "recording/reproduction" and "fast forwarding" as shown in FIG. 10 (b) and counterclockwise rotation of the cam gear from the "initial position" causes the mode change to "rewinding" as shown in FIG. 10 (c).

Figure 11:
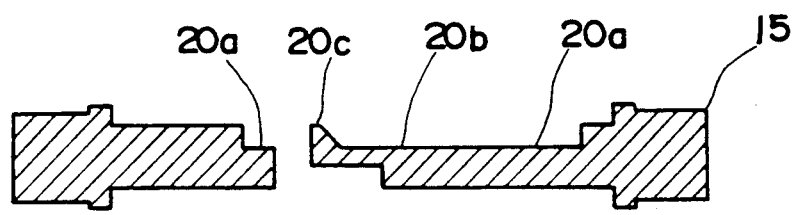
FIG. 11 is an enlarged sectional view taken along a line A—A in FIG. 10 (c).

Upon changing from "recording/reproduction" and "fast forwarding" to the "initial position", the head base shaft 4a moves along the inner circumferential groove 20b as shown by FIG. 10 (d) and passes by the central movable wall 20c of the cam portion 20, depressing said movable wall 20c downwardly as viewed in FIG. 11.

For changing from the "initial position" to "recording/reproduction" and "fast forwarding", the head base shaft 4a is restricted by the movable wall 20c and moves to the outer circumferential groove 20a.

What is claimed is:

1. A tape recorder including a mode changing mechanism, said mode changing mechanism comprising a head base; an electromotor; a circular cam gear having teeth provided with a tooth thickness and a front side toothless segment recessed from the front side of the gear in a direction of the tooth thickness, a rear side toothless segment recessed from the rear side of the gear in a direction of the tooth thickness and displaced from said front side toothless segment by a predetermined angular distance, and a cam portion operatively coupled with the head base so as to control movement of the head base as said cam gear is rotated forwardly or reversely; a pivotal FR arm; a pair of FR gears mounted to opposite sides of the pivotal FR arm, said pair of FR gears being displaced from each other in the direction of the tooth thickness and engageable with said cam gear; and a power transmission mechanism connected to the electromotor, the FR arm, and the FR gears, to transmit a drive from the electromotor to said pair of FR gears and to rotate said FR arm so as to rotate one of said FR gears depending on the rotational direction of the electromotor into engagement with said cam gear.

2. A tape recorder including a mode changing mechanism, said mode changing mechanism comprising a head base; an electromotor; a circular cam gear having teeth provided with a tooth thickness; a front side toothless segment recessed from the front side of the gear in a direction of the tooth thickness, a rear side toothless segment recessed from the rear side of the gear in a direction of the tooth thickness and displaced from said front side toothless segment by a predetermined angular distance, and a cam portion operatively coupled with the head base so as to control movement of the head base as said cam gear is rotated forwardly or reversely; a flywheel shaft; a flywheel supported by the flywheel shaft and adapted to be rotatably driven by the electromotor in the same direction as that in which the electromotor rotates; a flywheel gear which is integral and coaxial with said flywheel; a FR arm pivotally mounted on said rotation shaft of said flywheel; and a pair of FR gears mounted to opposite sides of the FR arm with respect to the axis of the rotation shaft of the flywheel, the FR gears being engaged with the flywheel gear, the FR arm being pivotal so as to engage the FR gears with said cam gear so that one of said FR gears may be selectively engaged with said cam gear as said flywheel and therefore said FR arm are rotated.

3. A tape recorder as recited in claim 2, wherein the head base has a recording/reproduction position, the tape recorder further including a tape take-up drive mechanism comprising a FWD plate rotatably mounted on the rotation shaft of the flywheel, a FWD gear engaged with a gear integral with the flywheel and a first gear of the tape take-up reel with which said FWD gear is engaged as the flywheel and therefore said FR arm are rotated; a first stopper means for bringing said FWD gear into engagement with said first gear only after the head base connected with the cam portion of said cam gear has moved to the "recording/reproduction" position; and a second stopper means for holding the FR gear at a position opposed to the toothless segment of the cam gear.

4. A tape recorder as recited in claim 3, wherein the head base has a fast forwarding position and wherein the first stopper means prevents the FWD gear from being engaged with said first gear after the head base has moved to the "fast forwarding" position in connection with the cam portion of the cam gear and, as the FR arm is rotated to bring the FR gear held by the second stopper means free from the holding effect of the second stopper means and to bring the freed FR gear partially to the inside of the toothless segment of the cam gear, brings the other FR gear into engagement with the second gear of the tape take-up reel.

5. A tape recorder as recited in claims 1 or 2, wherein the head base has a head base shaft, wherein said cam portion of the cam gear comprises an elongate ridge formed integrally therewith and wherein the head base shaft of the head base is guided along said ridge.

6. A tape recorder as recited in claims 1 or 2, wherein the head base has a head base shaft, wherein said cam portion of the cam gear comprises an elongate groove and wherein the head base shaft of the head base is guided along said groove.

7. A tape recorder as recited in claims 1 or 2, wherein the head base has respective positions corresponding to stop, recording/reproduction, fast forwarding and rewinding modes of the tape recorder and wherein the cam portion of the cam gear is configured to move the head base to respective positions corresponding to the "stop", "recording/reproduction", "fast forwarding" and "rewinding" modes.

8. A tape recorder as recited in claim 7, wherein the head base has a head base shaft, wherein said cam portion of the cam gear comprises an elongate ridge formed integrally therewith and wherein the head base shaft of the head base is guided along said ridge.

9. A tape recorder as recited in claim 7, wherein the head base has a head base shaft, wherein said cam portion of the cam gear comprises an elongate groove and wherein the head base shaft of the head base is guided along said groove.

10. A mode changing mechanism in a tape recorder having a tape head and a moveable head base for supporting the tape head, the mode changing mechanism comprising:
  a cam gear having a cam portion engaged with the head base so as to control movement of the head base as said cam gear is rotated forwardly or reversely;
  a rotation shaft having a rotation axis;
  a first gear rotatable about the rotation axis of the rotation shaft in a first rotation direction and in a second rotation direction opposite to the first direction;
  drive means coupled to the first gear for driving the first gear in the first rotation direction and in the second rotation direction, selectively;
  an arm pivotally supported by the rotation shaft for pivotal movement in a first direction as the first gear rotates in the first direction and for pivotal movement in a second direction as the first gear rotates in the second direction; and
  second and third gears mounted to respectively opposite sides of the arm with respect to the rotation axis of the rotation shaft, the second and third gears being engaged with the first gear, the arm being pivotal in the first direction so as to displace the second gear toward the cam gear to selectively engage the cam gear during a mode change, the arm being pivotal in the second direction so as to displace the third gear toward the cam gear to selectively engage the cam gear during a mode change.

11. A mode changing mechanism as claimed in claim 10, wherein the arm is pivotal in the first direction so as to engage the second gear with the cam gear, the arm being pivotal in the second direction so as to engage the third gear with the cam gear.

12. A mode changing mechanism as claimed in claim 10, wherein the cam gear comprises a substantially circular toothed gear having a front side toothless segment recessed from the front side of the gear in a direction of the tooth thickness, a rear side toothless segment recessed from the rear side of the gear in a direction of the tooth thickness and displaced from said front side toothless segment by a predetermined angular distance.

13. A mode changing mechanism as recited in claim 12, wherein the head base has a recording/reproduction position, the mode changing mechanism further comprising:
  a tape take-up drive mechanism having a plate rotatably mounted on the rotation shaft, a fourth gear rotatably supported by the plate and engaged with the first gear so as to rotate with rotation of the first gear, a take-up reel gear with which the fourth gear is engaged so as to rotate with rotation of the fourth gear as the arm is pivoted in the second direction;
  a first stopper means for bringing the fourth gear into engagement with the take-up reel gear only after the head base has moved to the "recording/reproduction" position; and a second stopper means for holding the second gear at a position opposed to one of the toothless segments of the cam gear.

14. A mode changing mechanism as recited in claim 13:
further comprising a second take-up reel gear;
wherein the head base has a fast forwarding position and wherein the first stopper means prevents the fourth gear from being engaged with the take-up reel gear after the head base has moved to the fast forwarding position; and
wherein, as the arm is pivoted to bring the second gear held by the second stopper means free from the holding effect of the second stopper means and to bring the freed gear partially to the inside of the toothless segment of the cam gear, the first stopper means brings the third gear into engagement with the second tape take-up reel gear so as to transmit rotation of the third gear to the second take-up reel gear.

15. A mode changing mechanism as recited in claim 10, wherein the head base has respective positions corresponding to stop, recording/reproduction, fast forwarding and rewinding modes of the tape recorder and wherein the cam portion of the cam gear is configured to move the head base to respective positions corresponding to the stop, recording/reproduction, fast forwarding and rewinding modes.

16. A mode changing mechanism as recited in claims 10, wherein the head base has a head base shaft, wherein the cam portion of the cam gear comprises an elongate ridge formed integrally with the cam gear and wherein the head base shaft of the head base is guided along the ridge.

17. A mode changing mechanism as recited in claims 10, wherein the head base has a head base shaft, wherein the cam portion of the cam gear comprises an elongate groove and wherein the head base shaft of the head base is guided along the groove.

18. A mode changing mechanism in a tape recorder having a tape head and a moveable head base for supporting the tape head, the mode changing mechanism comprising:
a cam gear having a cam portion engaged with the head base so as to control movement of the head base as said cam gear is rotated forwardly or reversely;
a rotation shaft having a rotation axis;
a first gear rotatable about the rotation axis of the rotation shaft in a first rotation direction and in a second rotation direction opposite to the first direction;
a motor coupled to the first gear for driving the first gear in the first rotation direction and in the second rotation direction, selectively;
an arm pivotally supported by the rotation shaft for pivotal movement in a first direction as the first gear rotates in the first direction and for pivotal movement in a second direction as the first gear rotates in the second direction; and
second and third gears mounted to respectively opposite sides of the arm with respect to the rotation axis of the rotation shaft, the second and third gears being engaged with the first gear, the arm being pivotal in the first direction so as to displace the second gear toward the cam gear to selectively engage the cam gear during a mode change, the arm being pivotal to the second direction so as to displace the third gear toward the cam gear to selectively engage the cam gear during a mode change.

19. A mode changing mechanism as claimed in claim 18 wherein the arm is pivotal in the first direction so as to engage the second gear with the cam gear, the arm being pivotal in the second direction so as to engage the third gear with the cam gear.

20. A mode changing mechanism as claimed in claim 18 wherein the cam gear comprises a substantially circular toothed gear having a front side toothless segment recessed from the front side of the gear in a direction of the tooth thickness, a rear side toothless segment recessed from the rear side of the gear in a direction of the tooth thickness and displaced from said front side toothless segment by a predetermined angular distance.

21. A mode changing mechanism as recited in claim 20, wherein the head base has a recording/reproduction position, the mode changing mechanism further comprising:
a tape take-up drive mechanism having a plate rotatably mounted on the rotation shaft, a fourth gear rotatably supported by the plate and engaged with the first gear so as to rotate with rotation of the first gear, a take-up reel gear with which the fourth gear is engaged so as to rotate with rotation of the fourth gear as the arm is pivoted in the second direction;
a first stopper means for bringing the fourth gear into engagement with the take-up reel gear only after the head base has moved to the "recording/reproduction" position; and
a second stopper means for holding the second gear at a position opposed to one of the toothless segments of the cam gear.

22. A mode changing mechanism as recited in claim 21:
further comprising a second take-up reel gear;
wherein the head base has a fast forwarding position and wherein the first stopper means prevents the fourth gear from being engaged with the take-up reel gear after the head base has moved to the fast forwarding position; and
wherein, as the arm is pivoted to bring the second gear held by the second stopper means free from the holding effect of the second stopper means and to bring the freed gear partially to the inside of the toothless segment of the cam gear, the first stopper means brings the third gear into engagement with the second tape take-up reel gear so as to transmit rotation of the third gear to the second take-up reel gear.

23. A mode changing mechanism as recited in claim 18 wherein the head base has respective positions corresponding to stop, recording/reproduction, fast forwarding and rewinding modes of the tape recorder and wherein the cam portion of the cam gear is configured to move the head base to respective positions corresponding to the stop, recording/reproduction, fast forwarding and rewinding modes.

24. A mode changing mechanism as recited in claim 18, wherein the head base has a head base shaft, wherein the cam portion of the cam gear comprises an elongate ridge formed integrally with the cam gear and wherein the head base shaft of the head base is guided along the ridge.

25. A mode changing mechanism as recited in claim 18, wherein the head base has a head base shaft, wherein the cam portion of the cam gear comprises an elongate groove and wherein the head base shaft of the head base is guided along the groove.

* * * * *